United States Patent [19]

Hoddie et al.

[11] Patent Number: 5,719,595
[45] Date of Patent: Feb. 17, 1998

[54] METHOD AND APPARAUTS FOR GENERATING A TEXT IMAGE ON A DISPLAY WITH ANTI-ALIASING EFFECT

[75] Inventors: James P. Hoddie, Mountain View; Ian D. Ritchie, Boulder Creek, both of Calif.

[73] Assignee: Apple Computer, Inc., Cupertino, Calif.

[21] Appl. No.: 437,640

[22] Filed: May 9, 1995

[51] Int. Cl.$^6$ ................................... G06T 11/00
[52] U.S. Cl. ..................... 345/136; 382/269; 395/141
[58] Field of Search ..................... 345/136, 137; 382/269; 358/447; 395/142, 143, 141

[56] References Cited

U.S. PATENT DOCUMENTS

| | | |
|---|---|---|
| 3,471,848 | 10/1969 | Manber . |
| 3,480,943 | 11/1969 | Manber . |
| 4,437,122 | 3/1984 | Walsh et al. ............... 348/625 |
| 4,851,825 | 7/1989 | Naiman ..................... 345/132 |
| 4,907,282 | 3/1990 | Daly et al. ................. 382/242 |
| 4,908,780 | 3/1990 | Priem et al. ............ 345/136 X |
| 5,155,805 | 10/1992 | Kaasila ..................... 395/151 |
| 5,249,242 | 9/1993 | Hanson et al. ............. 382/269 |
| 5,270,836 | 12/1993 | Kang ........................ 358/459 |
| 5,270,837 | 12/1993 | Chen et al. ................ 358/467 |
| 5,276,531 | 1/1994 | Chen et al. ................ 358/443 |
| 5,301,267 | 4/1994 | Hassett et al. ............. 395/150 |
| 5,325,479 | 6/1994 | Kaasila ..................... 395/151 |
| 5,432,898 | 7/1995 | Curb et al. ................. 395/143 |
| 5,444,552 | 8/1995 | Smith, III .................. 358/465 |
| 5,459,828 | 10/1995 | Zach et al. ................. 395/151 |
| 5,502,462 | 3/1996 | Mical et al. ................ 345/185 |
| 5,579,030 | 11/1996 | Karow ...................... 345/143 |

FOREIGN PATENT DOCUMENTS

| | | | |
|---|---|---|---|
| 0344952 | 5/1989 | European Pat. Off. | ....... H04N 17/04 |
| 0428356 | 11/1990 | European Pat. Off. | ......... G09G 1/14 |
| 0458571 | 11/1991 | European Pat. Off. . | |
| WO9406094 | 3/1994 | WIPO . | |

OTHER PUBLICATIONS

IBM Technical Disclosure Bulletin, vol. 35, No. 1B, "Pel Position Skewing For Anti-Aliased Font Resolution Reduction", Jun. 1992, pp. 19-21.

*Primary Examiner*—Raymond J. Bayerl
*Assistant Examiner*—Seth D. Vail
*Attorney, Agent, or Firm*—Blakely, Sokoloff, Taylor & Zafman

[57] ABSTRACT

A method for generating an image having anti-aliasing effect for display on a display system is described. An outline of the image is first generated. The outline includes a plurality of outline points defining a plurality of horizontal and vertical edges of the outline. The outline is then grid-fitted onto a target grid with each of the outline points located at the center of one of a plurality of grid boxes of the target grid such that each of the horizontal and vertical edges of the outline extends through some of the grid boxes of the target grid. The anti-aliasing effect is provided to the grid-fitted outline by determining gray scale of each grid box of the target grid through which one of the horizontal and vertical edges extends. The image has a sharp display image on the display system while having minimized aliasing. An apparatus is also described for generating an image having anti-aliasing effect for display on a computer controlled display system.

21 Claims, 9 Drawing Sheets

METHOD AND APPARAUTS FOR GENERATING A TEXT IMAGE ON A DISPLAY WITH ANTI-ALIASING EFFECT

FIELD OF THE INVENTION

The present invention pertains to the field of digital image processing. More particularly, this invention relates to a method and apparatus for generating a text image such as glyph for display on a computer controlled display system with anti-aliasing effect.

BACKGROUND OF THE INVENTION

Prior art imaging systems typically produce a final output image using two distinct steps. First, imaging data is encoded and placed into a frame buffer. In a second step, when the frame buffer is at least partially filled, this encoded data is extracted and transmitted to a marking device (e.g., a display or a printer). Traditionally, the frame buffer has contained the precise marking pattern (i.e., bitmap or pixel map) to be utilized by the marking device when producing the final output image.

For example, in a prior art bi-level imaging system with a marking device capable of either creating a mark at a given spot of leaving the spot blank, the frame buffer consists of binary memory with each bit in the memory representing a spot on the device's output medium. For imaging systems which include marking devices capable of imaging in multiple colors or gray levels, each spot to be imaged by the device is represented by a corresponding value in the frame buffer that specifies the color or luminance of that particular spot.

A problem develops when characters such as the Roman letters "A", "B", "C", etc., or other glyphs having slanted and/or curved portions are to be rendered in typeface quality by way of a bit-mapped rendering apparatus (e.g. a raster-based CRT or a laser printer). The slanted and/or curved edge portions of the images can not be rendered in ideal form if the resolution of the bit-mapped rendering apparatus or the resolution of a corresponding, bit-mapped display media is below a very high value (e.g., below 1,000 dots per inch).

The finite resolution of many bit-mapped rendering devices (e.g., CRT's, dot-matrix or laser printers) can give the rendition of the slanted and/or curved portions of glyphs such as "A", "B", "C", a jagged appearance instead of a desired smooth appearance.

A variety of techniques have been proposed for minimizing the jagged appearance. Such techniques are generally referred to as "anti-aliasing".

One form of anti-aliasing, which is referred to here as "grayscaling", modulates the intensity or gray scale value of certain individual pixels in a bit-mapped rendition when such pixels are found at and/or near slanted/curved edges of an image. The intensity modulation gives such edges a smooth appearance.

Intensity modulation (grayscaling) is commonly used in CRT (cathode ray tubes) displays and the like where a "z" control is available for convenient modulation of dot intensity independently of "x" and "y" dot placement controls. Dot size modulation is typically used by laser printers and like display means that do not have an independent "z" controller.

Prior anti-aliasing approaches such as the one described above have been burdened by the problems of (1) over-complexity and (2) excessive execution time. Sets of relatively complex, pattern recognition and decision-making rules are typically constructed for letting a computer decide which pixels of the bit-mapped rendering apparatus or display medium are to be turned on or off, and if turned on at what intensity, size, and/or other anti-aliasing level.

Another problem is that if a text image with sharp horizontal and vertical edges is rendered on a television screen (e.g., an NTSC standard color television), these sharp edges cause beating (i.e., a jagged appearance) on the television screen. This is typically due to the fact that a standard television set uses a convolution technique to render an image on the screen that causes a pixel of the image to have a dependency on its adjacent pixel. This is typically done by passing the bit-mapped image data through a digital filter. Another situation in which the bit-mapped image data needs to pass through a digital filter is when the image data needs to be scaled up or down. When this occurs, dependency is also established for each pixel with respect to its adjacent pixels.

SUMMARY OF THE INVENTION

One of the features of the present invention is to generate a text image with anti-aliasing effect on all edges of the image such that the text can have a sharp appearance with minimized aliasing when being displayed on a display.

A computer implemented method for generating an image having anti-aliasing effect for display on a display is described. An outline of the image is first generated. The outline includes a plurality of outline points defining a plurality of horizontal and vertical edges of the outline. The outline is then placed onto a target grid with the outline points located inside one of a plurality of grid boxes of the target grid such that each of the horizontal and vertical edges of the outline extends through some of the grid boxes of the target grid. The anti-aliasing effect is provided to the outline by determining the gray scale of each grid box of the target grid through which one of the horizontal and vertical edges extends such that the image has a sharp appearance on the display while having minimized aliasing.

A method for rendering a bit-mapped image having anti-aliasing effect onto a pre-specified target grid from a set of instructions defining an outline of the image is also described. A first data is formed to define a first plot of the outline grid-fitted onto the target grid. A second data is formed to define a second plot of the outline which is the first plot of the outline evenly displaced on the target grid from its grid-fitted position. A third data is formed to define a third plot of the outline which is the second plot of the outline upwardly scaled from the target grid onto a mezzanine grid. Plural grid boxes of the mezzanine grid tile perfectly into each grid box of the target grid.

An apparatus for generating an image having anti-aliasing effect for display on a display is also described. The apparatus includes circuitry for generating an outline of the image. The outline includes a plurality of outline points defining a plurality of horizontal and vertical edges of the outline. Circuitry is also provided for placing the outline onto a target grid with each of the outline points located inside one of a plurality of grid boxes of the target grid such that each of the horizontal and vertical edges of the outline extends through some of the grid boxes of the target grid. Circuitry is provided for providing the anti-aliasing effect to the outline on the target grid by determining gray scale of each grid box of the target grid through which one of the horizontal and vertical edges extends such that the image has a sharp appearance on the display while having minimized aliasing.

An apparatus for rendering a bit-mapped image having anti-aliasing effect onto a pre-specified target grid from a set of instructions defining an outline of the image is described. The apparatus includes circuitry for forming a first data defining a first plot of the outline grid-fitted onto the target grid. Circuitry is also provided for forming a second data defining a second plot of the outline which is the first plot of the outline evenly displaced on the target grid from its grid-fitted position. Circuitry is provided for forming a third data defining a third plot of the outline which is the second plot of the outline upwardly scaled from the target grid onto a mezzanine grid. Plural grid boxes of the mezzanine grid tile perfectly into each grid box of the target grid.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
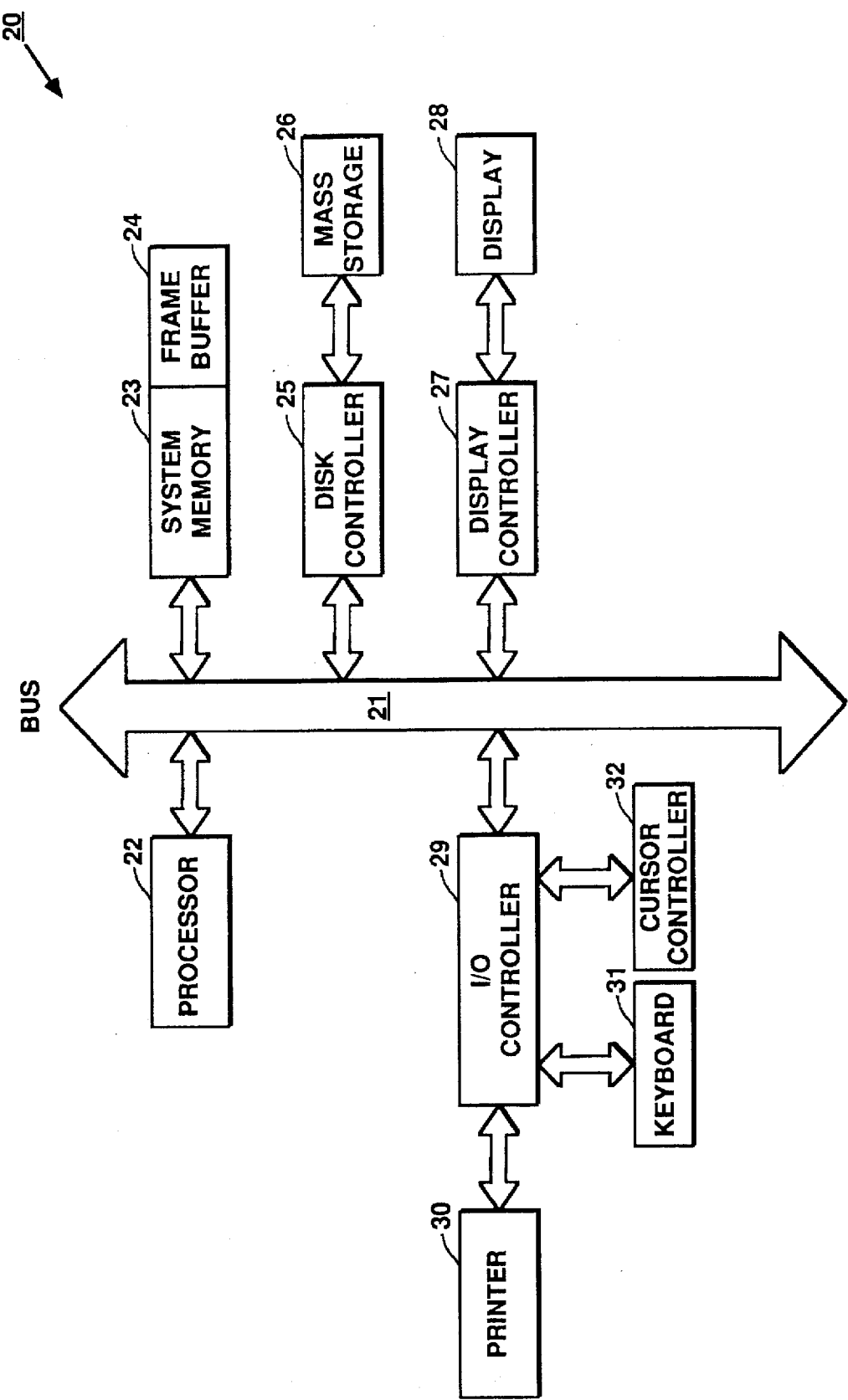
FIG. 1 illustrates a computer controlled display system that adopts one embodiment of the present invention.

FIG. 1 shows a computer based system 20 having a computer controlled display or image rendering system for generating graphics and text images according to one embodiment of the present invention. For one embodiment, computer system 20 of FIG. 2 operates in multimedia environment and supports integrated digital media and three-dimensional graphics and models. For a further embodiment, computer system 20 is a personal computer. For other embodiments, computer system 20 can be a notebook computer, a laptop computer, a minicomputer, a workstation computer, a mainframe computer, or any other type of computer system.

Computer system 20 includes a processor 22 which is often a microprocessor such as the commercially available 68030 or 68040 microprocessor from Motorola. Computer system 20 also includes a system bus 21 and system memory 23 for storage of instructions and data for use by processor 22. System memory 23 includes RAM, ROM, SRAM, DRAM, and/or flash EPROM. System bus 21 typically includes address and data lines as weft as control lines for allowing communication of data and instruction between various components of computer system 20 such as processor 22 and system memory 23 as well as all other components shown in FIG. 2. Computer system 20 also includes a frame buffer 24 for storing pixel data or bit-mapped image data for rendering images on a display 28 or to be printed by printer.

Computer system 20 also includes a mass storage device 26, such as a hard disk, and a disk controller 25 which is typically coupled to system bus 21. Computer system 20 further includes a display controller 27 for processing image data to be imaged on display 28. As described above, the image data is stored in frame buffer 24 before being displayed on display 28. For one embodiment, display 28 is a computer monitor (e.g., CRT display or liquid crystal display). For another embodiment, display 28 is a television set (e.g., NTSC standard color television set). Alternatively, display 28 can be any known display system having displaying pixels each of which has a dependency upon its adjacent pixels (i.e., analog display system).

Input and output of computer system 20 is also provided by an input/output controller 29 which may be one unit or several different units as is known in the art for controlling the input and output from/to printers such as printer 30, keyboards such as keyboard 31, and cursor control devices such as cursor controller 32. For one embodiment, printer 30 is a laser printer. Alternatively, printer 30 can be any other known "hard copy" display device such as inkjet printer, dot matrix printer, etc.

Processor 22 retrieves programs containing instructions and data from mass storage device 26 and causes these instructions and data to be loaded into system memory 23 for execution of the instructions. Processor 22 executes the instructions and causes a displayable representation, such as bit-mapped image to be created in frame buffer 24, which representation is then conveyed over system bus 21 to display controller 27 or I/O controller 29 so that the displayable representation may then be displayed on display 28 or printer by printer 30.

Figure 2:
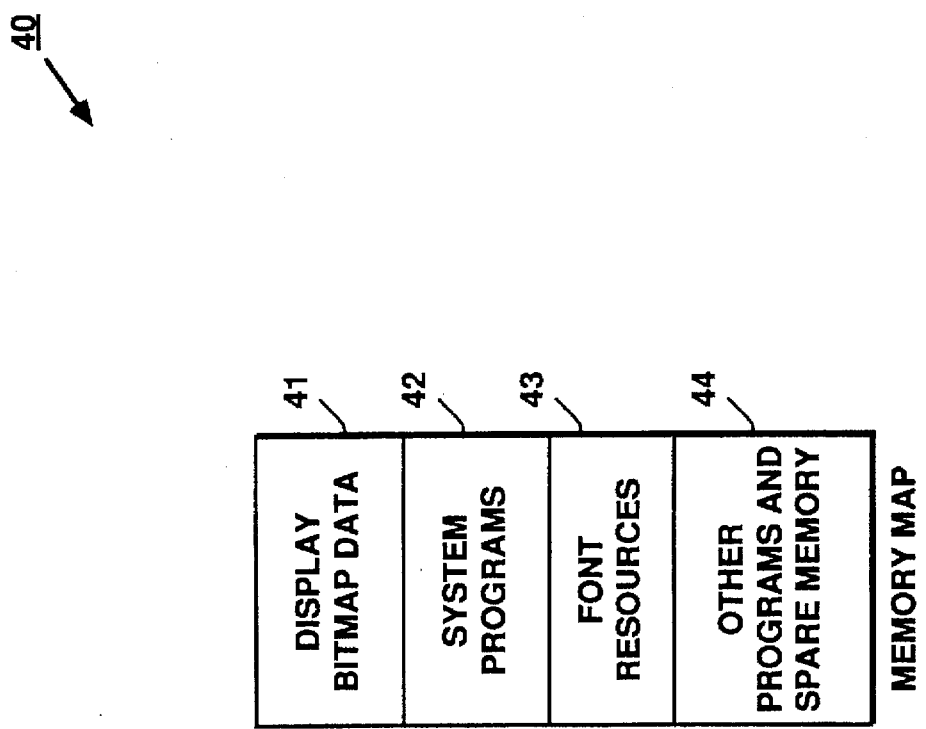
FIG. 2 shows the memory arrangement of the system memory and frame buffer of the display system of FIG. 1.

FIG. 2 shows the memory map 40 of system memory 23 and frame buffer 24 of FIG. 1. FIG. 2 shows a typical arrangement of the major programs contained within system memory 23 and frame buffer 24 illustrated in FIG. 2. In particular, there is shown a display bit map section 41. Bit map section 41 represents the bit-mapped image data stored in frame buffer 24. Each pixel data in a bit-mapped image data defines a particular pixel on an output imaging device (e.g., display 28 or printer 30). As is known, the bit map can be described as a two dimensional array of points having known coordinates which map to display 28 or printer 30. As is also well known, the appearance of a pixel on a display device is controlled by the signals applied to that pixel which signals are derived from data signals stored for that pixel in the bit map memory.

System memory 23 also includes system programs 42 which represent a variety of sequences of instructions for execution by the CPU or processor 22 in order to support system level input and output and control. For example, the system programs such as disk operating systems and the like may be stored within this memory section 42. Also, the programs which provide scan conversion such as the scan converter 65 of FIG. 3 and programs which provide the outline rendering function, target grid conversion function, and text anti-aliasing processing function as described hereinafter for rendering a bit-mapped glyph image may also be stored in memory section 42. These programs are shown in FIG. 3 as outline rendering unit 61, target grid converter 62, and text anti-aliasing processor 63.

In addition, memory section 42 may also include a bit-mapped image rendering driver (i.e., program) for obtaining the bit-mapped image data from frame buffer 24 and for controlling display controller 27 and/or I/O controller 29 to render a corresponding bit mapped image onto either display 28 and/or printer 30. The bit-mapped image rendering driver can be implemented by any known bit-mapped image rendering software program and is typically hardware-dependent. System memory 23 (FIG. 2) typically also includes font resource data shown within memory section 43, which will be described in more detail below, in conjunction with FIG. 3. Additionally, space within system memory 23 is typically also reserved for other programs and spare memory and is shown as memory section 44 in FIG. 2. These other programs may include a variety of useful computational or utility programs as may be desired.

It will be appreciated that in an implementation of the invention, the font resources as well as the system programs will be retrieved from mass storage device 26 by processor 22 and then loaded into system memory 23. Alternatively, mass storage device 26 may be used as virtual memory in which case the font resources may remain on mass storage device 26.

Figure 3:
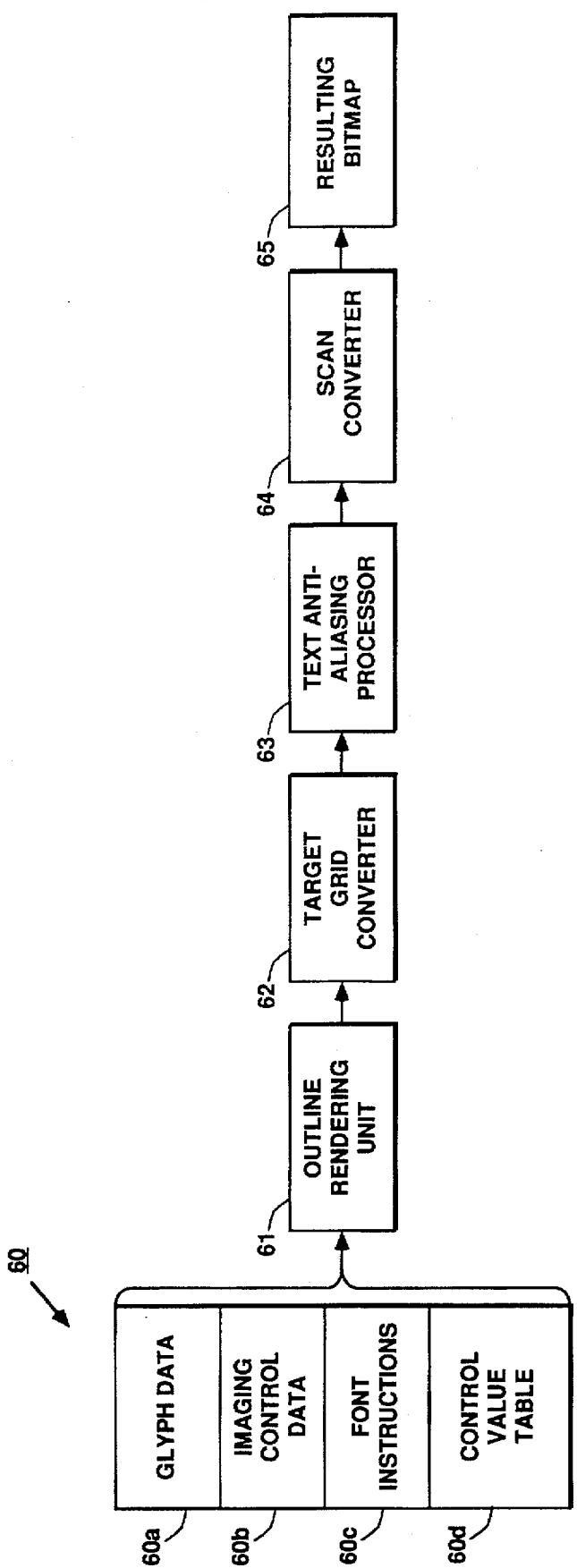
FIG. 3 shows a flow chart of the process of converting outline font data of a glyph into a bit-mapped image data through an outline rendering unit, a target grid converter, a text anti-aliasing processor, and a scan converter of the display system of FIG. 1 to produce the resulting bit-mapped image in accordance with one embodiment of the present invention.

FIG. 3 shows the data structure 60 of the font resource data stored in memory section 43 of FIG. 2. As can be seen from FIG. 3, data structure 60 includes glyph data (or text codes) 60a for identifying the alphanumeric or other characters to be printed or otherwise displayed. The to-be-rendered text may include a character string such as "Read this immediately."

The glyph data is accompanied by imaging (print or display) control data 60b (1) for defining the font in which the text (e.g., the character string described above) is to be rendered (e.g., Courier, Helvetica, Palatino, or Times), (2) for defining the size of the glyphs (i.e., characters) to be printed or displayed (e.g., in terms of display's or printer's points or characters per inch), and for defining placement of the glyphs relative to a page corner or a display screen corner (absolute positioning) or relative to one another (e.g., proportionally spaced text, left justified, right justified, etc.).

The imaging control data 60b is then followed by font instruction data 60c. Font instruction data 60c specifies the font instructions for defining the shapes or outlines of various characters (or glyphs) that belong to a selected font in detail. An example of such font instruction is the TrueType™ font instructions the detail of which may be obtained from numerous publications, including U.S. Pat. No. 5,155,805 and U.S. patent application Ser. No. 07/997,897, filed on Dec. 29, 1992 by Michael R. Reed, entitled METHOD AND APPARATUS TO VARY CONTROL POINTS OF AN OUTLINE FONT TO PROVIDE A SET OF VARIATIONS FOR THE OUTLINE FONT, and assigned to the common assignee of the present application.

Figure 5:
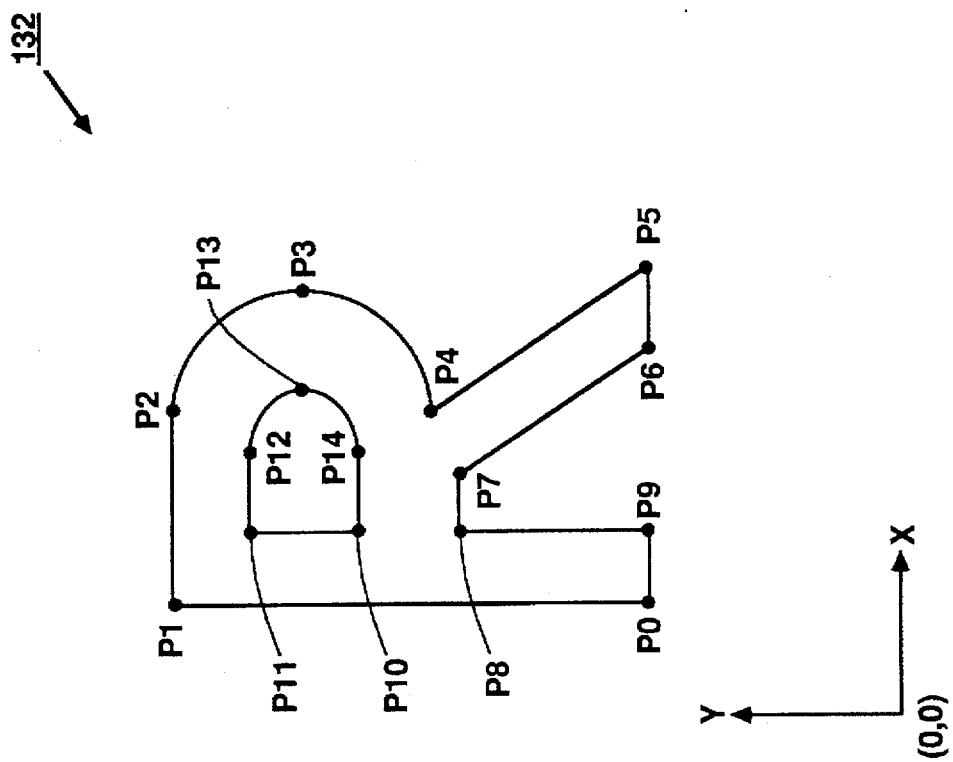
FIG. 5 shows a glyph "R" rendered by the outline rendering unit of FIG. 3 in an outline form with its associated outline points.

The font instruction data 60c includes outline plot instructions for plotting outlines of desired images, characters or other glyphs. One such outline is shown in FIG. 5 for the capital letter "R" 132. The outline plot instructions preferably define the plot at a relatively high resolution such as 1000 or more points per side of a printer's em square.

The outline plot instructions for the illustrated capital "R" character 132 as shown in FIG. 5 can be arranged to define a plurality of outline-defining points $P_0$–$P_{14}$ and one or more lines, arcs, circles or splines passing through, or terminating at, or otherwise relating to these options. The lines, arcs, splines or circles of each outline plot combine to define one or more closed contours which are to be "filled" with a desired color during rendering.

The outline 132 of the capital "R" character shown in FIG. 5 has a first point $P_0$ positioned at a first set of coordinates (e.g. X and Y) in a high-precision character space. A vertical line extends up from point $P_0$ to point $P_1$ to define the left vertical edge of the capital "R". In this example, it is assumed that the fill color will go on the right side of the contour line $P_0$–$P_1$ as one proceeds from the low-numbered point $P_0$ to the higher-numbered point $P_1$. A horizontal line extends from point $P_1$ to point $P_2$, to define the top left corner of the capital "R". An arc extends downward to the right from point $P_2$ to and through a next succeeding set of points, $P_3$–$P_4$ to close off the top right, outer edge of the capital "R". A further set of curved and/or slanted, lines and/or splines and a horizontal line extend from $P_4$ to $P_5$ and from there to $P_6$ and $P_7$, to thereby complete definition of the right slanted leg of the capital "R".

A further set of horizontal and vertical lines extend from point $P_7$, through points $P_8$–$P_9$ and back to point $P_0$ for completing the vertical left leg of the capital "R". A closed contour having a D shape passes through additional points $P_{10}$, etc., to define an inner hollow within the shape of the capital "R". Although only the outline 132 for capital "R" is shown it is to be understood that the font resource data structure 60 contains outlines for a large number of characters or glyphs (e.g., A–Z, a–z, 0–9, etc.).

Referring again to FIG. 3, the font resource data structure 60 also includes a control value table data 60d. Control value table data 60d contains a set of figures that can be used to set uniform sizes for different glyph or character elements. The contents of the control value table correspond to the basic unit of measurement in the field of digital typography. As such, instructions using values from the control value table can scale glyphs to the appropriate point size.

Figure 6:
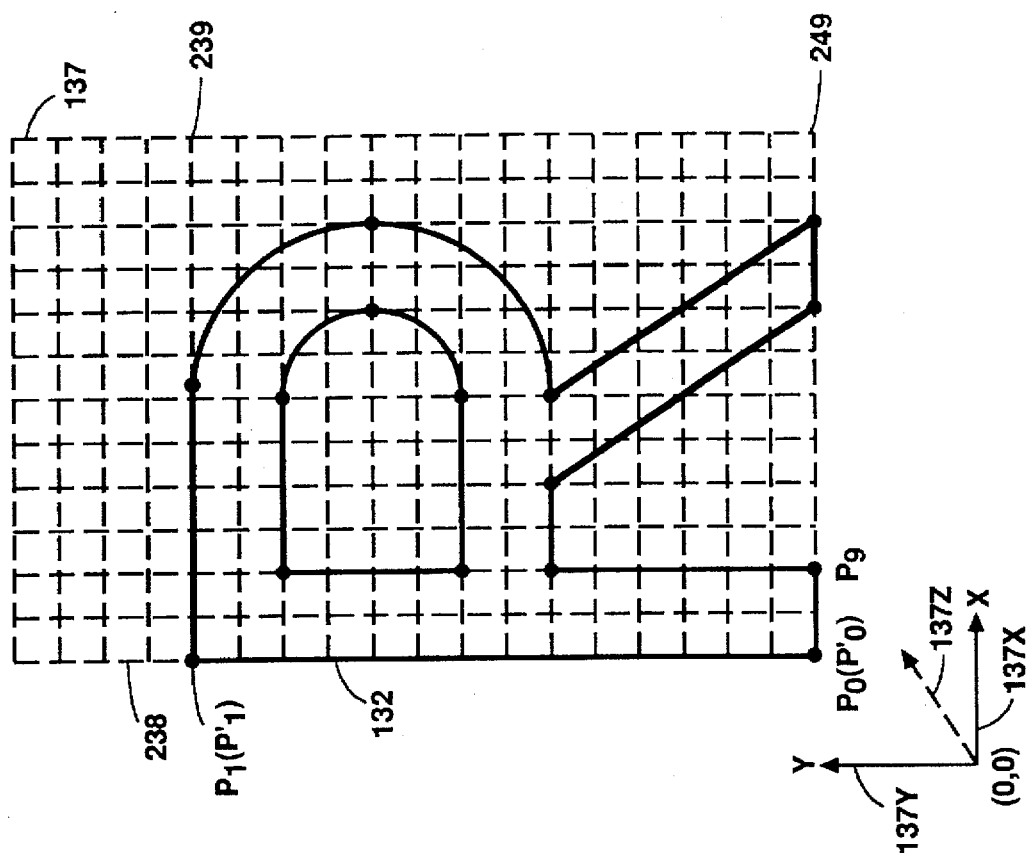
FIG. 6 shows the glyph "R" grid-fitted onto a target grid by the target grid converter of FIG. 3.

As can be seen from FIG. 3, font resource data structure 60 is applied as input to outline rendering unit 61. Outline rendering unit 61 then processes the data to generate data representing the outline 132 (FIG. 5) with outline points $P_0$–$P_{14}$. The output of outline rendering unit 61 is then applied to target grid converter 62. Target grid converter 62 grid-fits (i.e., snap-fits) and scales the outline 132 of capital letter "R" to a target grid 137 (shown in FIG. 6). As can be seen from FIG. 6, vertical and horizontal edges of the outline 132 are snap-fitted to the grid boxes of target grid 137. The process of grid-fitting of target grid converter 52 will be described in more detail below, also in conjunction with FIG. 4. "Grid fitting" means that each of outline-defining points $P_0$–$P_{14}$ of obtained outline 132 is mapped to a corresponding position on target grid 137 where the corresponding position has integer coordinate values along both the horizontal and vertical axes, 137x and 137y, of target grid 137. In other words, "grid fitting" means placing each of the outline points (e.g., outline points $P_0$–$P_{14}$) at the peripheral corner of a corresponding grid box such that all the vertical and horizontal edges of the outline are along the corresponding grid lines of target grid 137 (see FIG. 6).

By way of example, note that point $P_1$ maps to a corresponding point $P'_1$ at the intersection of dashed lines 238 and 239. Outline point $P_0$ maps to a corresponding point $P'_0$ at the intersection of dashed lines 238 and 249. Grid fitting is typically carried out by truncating less significant bits or digits of a high precision signal representing the scaled coordinates $P'_0$–$P'_N$ of the outline defining points on target grid 137. Grid fitting may alternatively be carried out by way of rounding out the scaled numbers.

"Scaling" defines the physical distance between rendered points such as $P'_0$ and $P'_1$. If one wished to render outline 132 at ten points, the distance between the coordinates of $P'_0$ and $P'_1$ would represent a first distance, whereas if one wished to render outline 132 at fourteen points, the distance between the coordinates of points $P'_0$ and $P'_1$ would represent a larger second value.

It is to be understood that target grid 137 is a data structure stored within system memory 23 (FIG. 1) and that this data structure 137 is formed as a matrix of bits, each of which can be switched to a logic high level ("1") or a logic low level ("0"). For each renderable pixel on display 28, there is at least one corresponding bit in the target grid data structure for indicating whether the pixel on display 28 will be filled or not with some particular color and/or shade.

Some embodiments provide a plurality of bits for each display pixel instead of a single bit per pixel. When this is done, one or more patternings of the plural bits may be used for indicating grayscale or other controllable characteristic (e.g., color, dot size, relative dot positioning, etc.) of each renderable pixel of the display medium 107. A Z axis (137z) is typically drawn to symbolize the effect of having plural bits in target grid 137 for each pixel on display 28.

Assume for example, that the image rendering driver of computer system 20 of FIG. 1 can render each display pixel at a discrete one of sixteen selectable grayscale levels. In such a case, a four-bit sequence 0000 is typically used to indicate that the display pixel on display 28 or printer 30 will be set to minimum intensity (e.g., a background white) and the four-bit code 1111 is used to indicate that the display pixel will be imaged at full intensity (e.g., forecolor black). The intermediate 4-bit binary codes, 0001, 0010, . . . , 1110 can be used to define fourteen additional intensity levels between minimum and maximum intensity and these intermediate levels can very in a linear or other manner, as desired. The Z-axis 137z of target grid 137 can then be visualized as having fifteen discrete levels of intensity for each display pixel in addition to the background level.

Before target grid converter 62 applies its output to processor 63, converter 62 also determines if the resulting bit-mapped image data 65 is to be applied to a television display for rendering the bit-mapped image. As described above, in some known display systems (e.g., NTSC color television display), a pixel displayed typically has a dependency on its adjacent pixel. This means that the imaging of a pixel is affected by the image of its adjacent pixel. This typically causes a vertical or horizontal edge of an image to beat on the display if the outline (e.g., outline 132) of the image is grid-fitted onto a target grid.

In order to eliminate the beating along the vertical and horizontal edges and in accordance with one embodiment of the present invention, the outline 132 is moved on target grid 137 off its grid-fitted position (see FIG. 7) to make the edges of the grid-fitted outline to be as fuzzy as possible if the outline 132 is to be image rendered on an analog monitor screen (e.g., television screen). When this occurs, the image rendered on the analog monitor screen (e.g., television screen) has all of its vertical and horizontal edges sharply displayed and without any beating. As can be seen from FIG. 7, outline point $P_0$ of outline 132 has moved to the center of a grid box 138. Alternatively, outline 132 can be displaced such that an outline point is located anywhere within its corresponding grid box. Target grid converter 62 then sends the displaced outline 132 on the target grid 137 to processor 63 for assigning the anti-aliasing effect to the glyph to be displayed.

Processor 63 assigns the anti-aliasing attributes to the outline 132. For one embodiment, processor 63 achieves this by determining gray scale of each grid box (i.e., pixel) of target grid 137. Alternatively, processor 63 can employ other known techniques to assign the anti-aliasing attributes to the outline 132.

Figure 8:
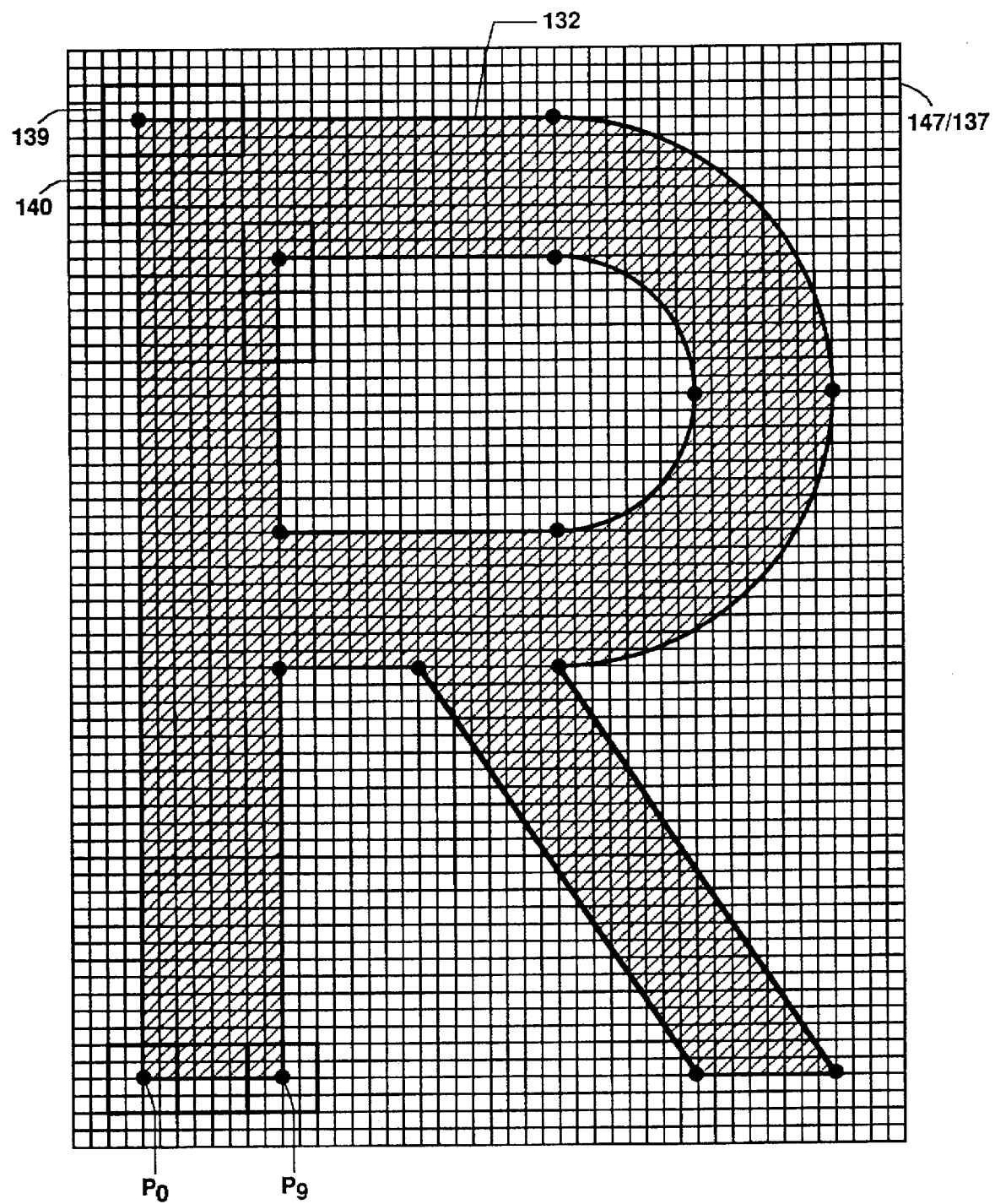
FIG. 8 shows the glyph "R" on a mezzanine grid which is the target grid upwardly scaled with higher resolution.

For one embodiment, process 63 determines the gray scale of each grid box by upwardly scaling the outline 132 from target grid 137 onto a mezzanine grid 147, a number of grid boxes of which are perfectly tiled into a grid box of target grid 137. Mezzanine grid 147 is shown in FIG. 8. This method will be described in detail below, in conjunction with FIGS. 8 and 9. Alternatively, other known methods or techniques can be employed to determine the gray scale of each grid box of target grid 137.

Figure 9:
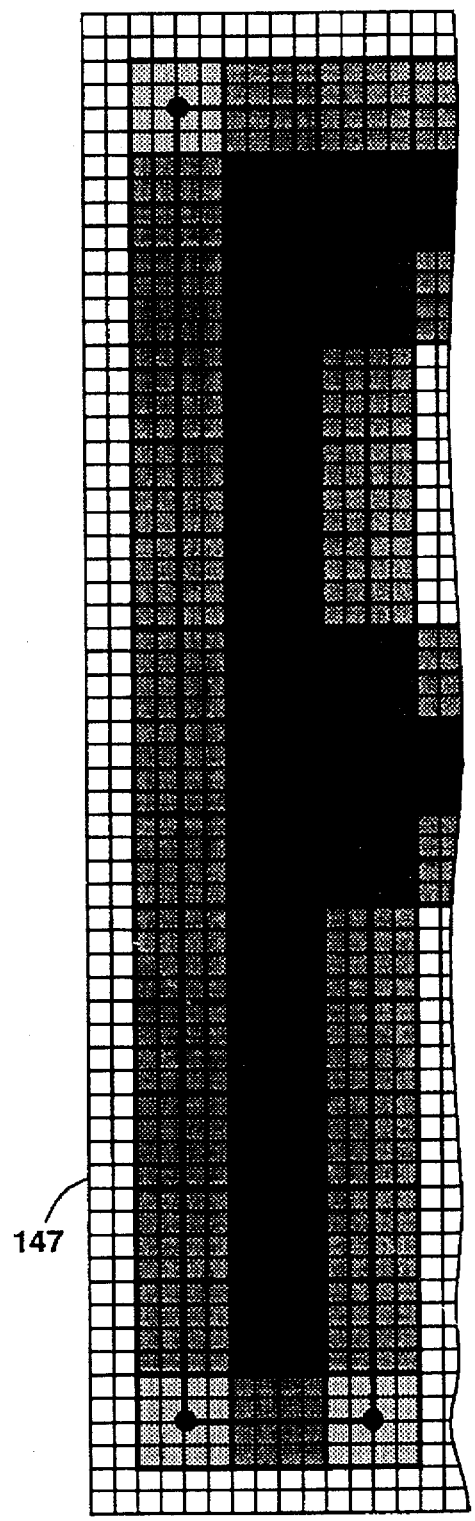
FIG. 9 partially shows the glyph "R" on the target grid with the anti-aliasing effect (i.e., gray scale) assigned.

As can be seen from FIG. 8, grid box 139 of target grid 137 is divided into sixteen grid sub-boxes. The gray scale of grid box 139 is therefore determined by how many grid sub-boxes within grid box 139 are filled (i.e., are within the contour of outline 132). As can be seen from FIG. 8, grid box 139 has four sub-boxes filled and grid box 140 has half of its sub-boxes of mezzanine grid 147 filled. Processor 63 then assigns the corresponding gray scale to each of grid boxes 139 and 140. FIG. 9 partially shows the glyph with gray scales assigned.

As can be seen from FIG. 8, when a grid box of target grid 137 has no sub-box of mezzanine grid 147 filled, then that grid box has a gray scale of zero (i.e., background white). If, however, the grid box of target grid 137 has all sixteen sub-boxes filled, then that grid box has a gray scale of sixteen (i.e., black). If the filled sub-boxes within a grid box is, for example, eight, then the gray scale of that grid box is eight. FIG. 9 partially shows the outline 132 with gray scales assigned.

As can be seen from FIG. 9, the grid boxes through which vertical line 150 extends are all gray scaled grid boxes, causing line 150 to attain fuzzy and non-crisp appearance. When such processed image is rendered on a display media, especially on television screen, vertical line 150 instead has a crisp and sharp appearance.

Referring back to FIG. 3, the output of processor 63 is then applied to scan converter 64 to convert the gray scale filled outline 132 on target grid 137 into the resulting bit-mapped image data 65 for storage in frame buffer 24 (FIG. 1). Scan converter 64 can be any known scan converter.

Figure 4:
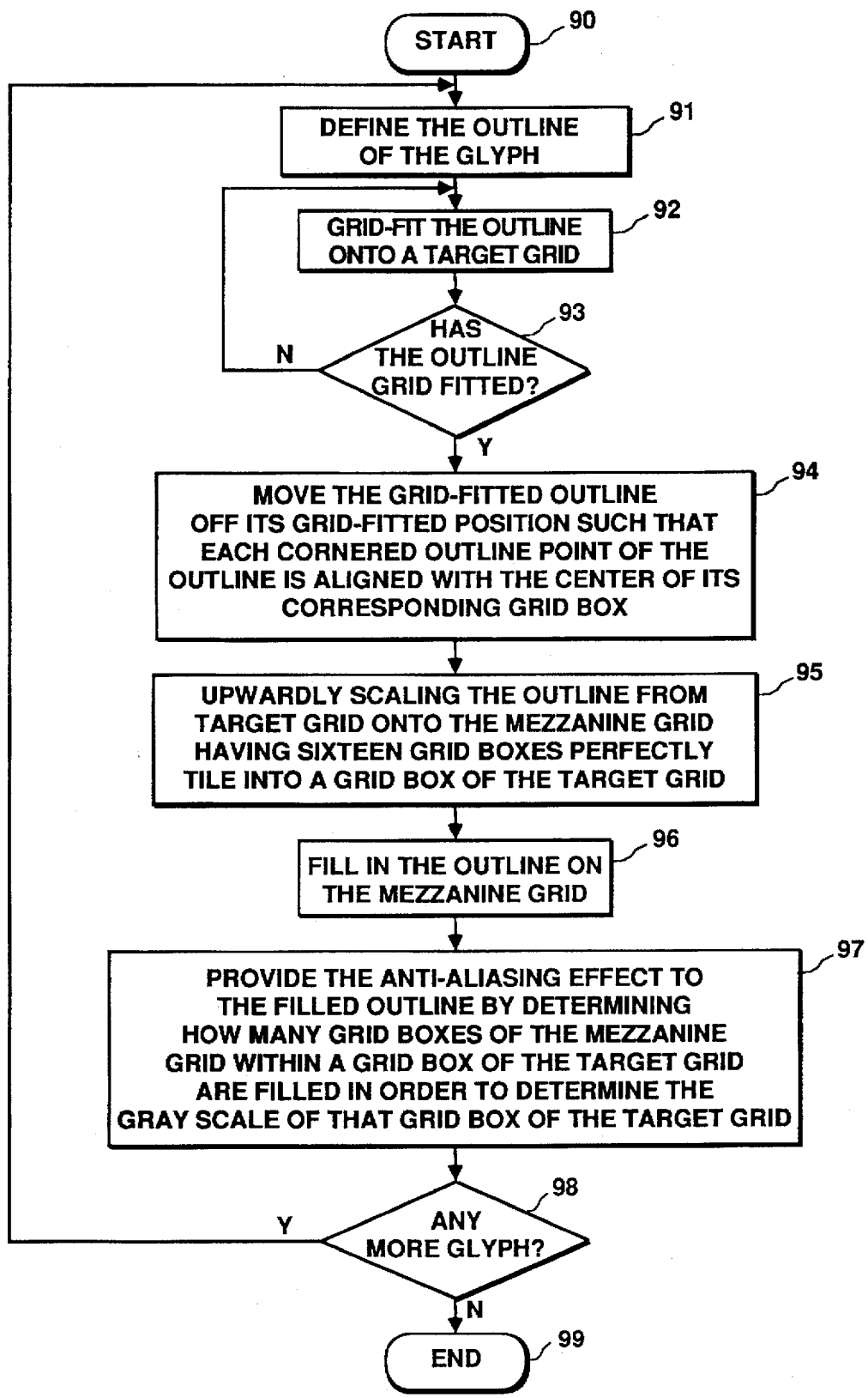
FIG. 4 shows a flow chart depicting the process implemented by the outline rendering unit, target grid converter, and text anti-aliasing processor in accordance with one embodiment of the present invention.

FIG. 4 shows the flow chart of the process implemented by outline rendering unit 61, target grid converter 62, and text anti-aliasing processor 63 for rendering a bit-mapped glyph image from font outline data to be displayed on a display (e.g., television display) in accordance with one embodiment of the present invention. As can be seen from FIG. 4, the process starts at step 90. At step 91, the outline of the glyph (see FIG. 5) is defined using the font rendering technique described above, in conjunction with FIG. 3. The process then moves to step 92, at which the outline is grid-fitted and scaled onto a target grid (see FIG. 6). Then the process moves to step 93 for determining whether the outline (e.g., outline 132 of FIG. 6) has been properly grid-fitted onto the target grid. If not, step 92 is again performed. As described above, scaling includes adjusting the coordinates of some of the outline points of the outline such that the outline can be grid-snapped (i.e., grid fitted) on the target grid (i.e., target grid 137).

Figure 7:
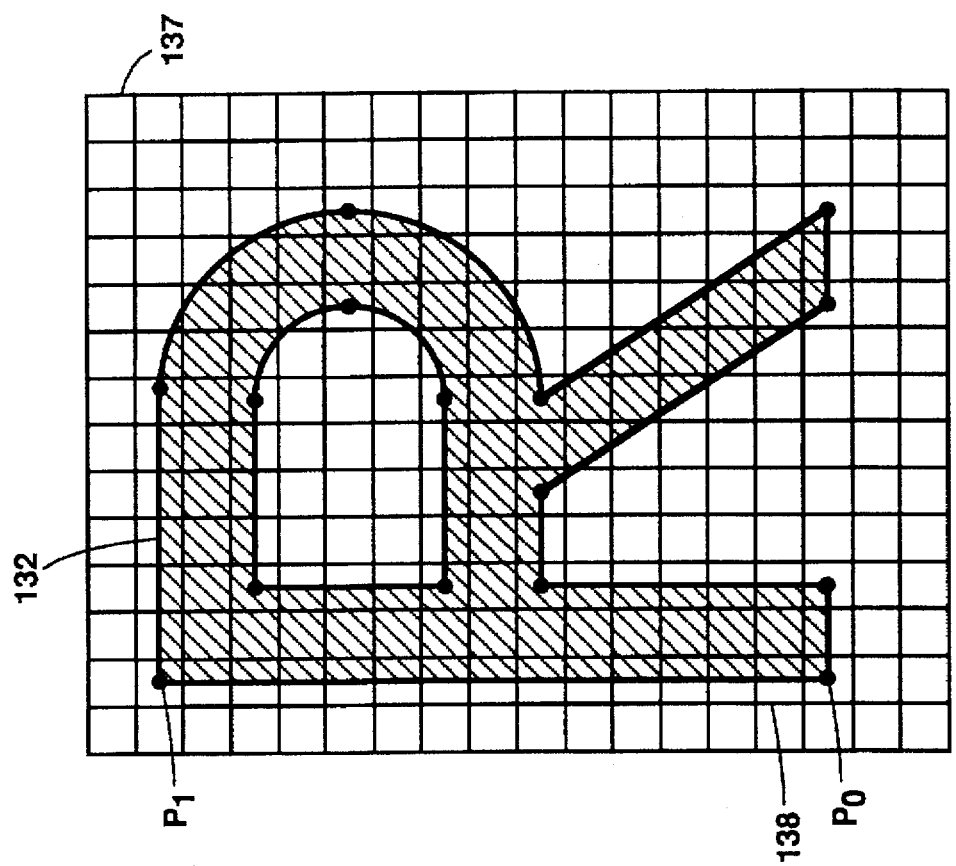
FIG. 7 shows the glyph "R" displaced from its grid-fitted position on the target grid by the target grid converter of FIG. 3.

If, at step 93, it is determined that the outline has grid-fitted onto the target grid, then step 94 is performed at which the grid-fitted outline is displaced such that each outline point of the outline is aligned with the center of its corresponding grid box (see FIG. 7). This is done by moving the outline 132 half grid box distance off its grid-fitted position on target grid 137 (see FIG. 7). For one embodiment, the outline 132 is moved half grid box distance both downwardly and towards the right end of target grid 137. For alternative embodiments, the outline 132 can be moved in any other directions on that target grid 137. In addition, the outline 132 can simply be moved such that some outline points of the outline 132 are aligned with the center of their corresponding grid boxes. Moreover, the outline 132 can simply be moved on target grid 137 such that all or some of the outline points of the outline 132 are located inside their corresponding grid boxes (i.e., anywhere inside the box).

Then step 95 is performed at which the displaced outline is upwardly scaled from the target grid onto a mezzanine grid that has, for example, sixteen grid boxes perfectly tile into a grid box of the target grid. This means the mezzanine grid has a relatively higher resolution than the target grid. In other words, each grid box of the target grid is blown up four times in order to determine the area within each grid box that is inside the outline (see FIG. 8). Then step 96 is performed at which the outline is filled on the mezzanine grid.

At step 97, the gray scale is assigned to each of the grid boxes of the target grid (see FIG. 9). The gray scale of a grid box is determined by the number of sub-boxes of the mezzanine grid within the grid box are filled (see FIG. 9). The process then moves to step 98 at which it is determined if any more glyph needs to be processed. If so, then the process returns to step 91. If not, the process ends at step 99.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for generating an image having anti-aliasing effect for display on a display system, comprising the steps of:

(A) generating an outline of the image, wherein the outline includes a plurality of outline points;

(B) grid-fitting the outline onto a target grid such that horizontal and vertical edges of the outline do not extend through grid boxes of the target grid;

(C) repositioning the grid-fitted outline on the target grid such that each of the vertical and horizontal edges of the grid-fitted outline extends through the grid boxes of the target grid;

(D) assigning a shading level to the grid boxes of the target grid in order to provide the anti-aliasing effect to the repositioned outline such that each of the edges of the outline is defined by a number of shaded grid boxes of the target grid, and wherein the repositioning of the grid-fitted outline prevents aliasing in display systems in which the display of a pixel is affected by the image of its adjacent pixel.

2. The method of claim 1, further comprising the steps of (a) producing a bit-mapped image data of the repositioned outline with the anti-aliasing effect; and (b) rendering the bit-mapped image data on a television screen of the display system, wherein each of the edges of the outline is sharply displayed.

3. The method of claim 1, wherein the step (D) further comprises the steps of (I) upwardly scaling the repositioned outline on the target grid by dividing each grid box of the target grid into a number of grid sub-boxes;

(II) filling in the upwardly scaled outline on the target grid;

(III) determining the shade of a grid box of the target grid by determining how many grid sub-boxes within the grid box are filled.

4. The method of claim 1, wherein the step (B) further comprises the step of adjusting coordinates of at least some of the outline points of the outline such that the outline can be grid-fitted onto the target grid.

5. The method of claim 1, wherein the display system further comprises an NTSC standard television display screen, wherein the method further comprises the step of rendering the repositioned outline with the anti-aliasing effect on the television display screen to produce the image with the edges sharply displayed.

6. The method of claim 1, wherein the step of assigning a shading level comprises coding each grid box of the target grid with a four-bit sequence indicating the shade of the display pixel corresponding to the grid box, such that the shading level is one of sixteen discrete and selectable shading levels.

7. A method for generating an image having anti-aliasing effect for display on a computer controlled display system, comprising the steps of:

(A) generating an outline of the image, wherein the outline includes a plurality of outline points defining a plurality of horizontal and vertical edges of the outline;

(B) placing the outline onto a target grid with each of the outline points located inside one of a plurality of grid boxes of the target grid such that each of the horizontal and vertical edges of the outline extends through some of the grid boxes of the target grid;

(C) assigning a shading level to the grid boxes of the target grid in order to provide the anti-aliasing effect to the outline on the target grid by determining a shade of each grid box of the target grid through which one of the edges extends, and wherein the placing of the outline prevents aliasing in display systems in which the display of a pixel is affected by the image of its adjacent pixel.

8. The method of claim 7, further comprising the steps of (a) producing a bit-mapped image data of the outline with the anti-aliasing effect;

(b) rendering the bit-mapped image data on a television display screen of the display system, wherein the image has a sharp appearance on the display system while having minimized aliasing.

9. The method of claim 7, wherein the step (C) further comprises the steps of (I) upwardly scaling the repositioned outline on the target grid by dividing each grid box of the target grid into a number of grid sub-boxes;

(II) filling in the upwardly scaled outline on the target grid;

(III) determining the shade of a grid box of the target grid by determining how many grid sub-boxes within the grid box are filled.

10. The method of claim 7, wherein the step of assigning a shading level comprises coding each grid box of the target grid with a four-bit sequence indicating the shade of the display pixel corresponding to the grid box, such that the shading level is one of sixteen discrete and selectable shading levels.

11. A method for rendering a bit-mapped image having anti-aliasing effect onto a pre-specified target grid from a set of instructions defining an outline of the image, comprising the steps of:
(A) forming a first data defining a first plot of the outline grid-fitted onto the target grid;
(B) forming a second data defining a second plot of the outline which is the first plot of the outline evenly displaced on the target grid from its grid-fitted position;
(C) forming a third data defining a third plot of the outline which is the second plot of the outline upwardly scaled from the target grid onto a mezzanine grid, wherein plural grid boxes of the mezzanine grid tile perfectly into each grid box of the target grid; and
(D) forming a fourth data defining a fourth plot of the outline which is the third plot of the outline scaled back from the mezzanine grid to the target grid with shadings assigned to the grid boxes of the target grid, wherein the shading of a grid box of the target grid depends on how many grid boxes of the mezzanine grid within the grid box of the target grid are filled, and wherein the displacement of the second plot of the grid-fitted outline from the grid-fitted position prevents aliasing in display systems in which the display of a pixel is affected by the image of its adjacent pixel.

12. The method of claim 11, further comprising the steps of
(a) producing a bit-mapped image data from the fourth data defining the fourth plot of the outline;
(b) rendering the bit-mapped image data on a television display screen, wherein each of the edges of the outline is sharply displayed.

13. The method of claim 11, wherein the shading assigned to the grid boxes of the target grid is one of sixteen discrete and selectable shading levels produced by coding each grid box of the target grid with a four-bit sequence indicating the shade of the display pixel corresponding to the grid box.

14. An apparatus for generating an image having anti-aliasing effect for display on a computer controlled display system, comprising:
(A) means for generating an outline of the image, wherein the outline includes a plurality of outline points defining a plurality of horizontal and vertical edges of the outline;
(B) means for placing the outline onto a target grid with each of the outline points located inside one of a plurality of grid boxes of the target grid such that each of the horizontal and vertical edges of the outline extends through some of the grid boxes of the target grid;
(C) means for providing the anti-aliasing effect to the outline by determining shading of each grid box of the target grid through which one of the horizontal and vertical edges extends such that the image has a sharp display image on the display system while having minimized aliasing, and wherein the placing of the outline prevents aliasing in display systems in which the display of a pixel is affected by the image of its adjacent pixel.

15. The apparatus of claim 14, further comprising
(a) means for producing a bit-mapped image data of the outline with the anti-aliasing effect;
(b) means for rendering the bit-mapped image data on a television display screen of the display system.

16. The apparatus of claim 14, wherein the means for providing further comprises
(I) means for upwardly scaling the outline on the target grid by dividing each grid box of the target grid into a number of grid sub-boxes;
(II) means for filling in the upwardly scaled outline on the target grid;
(III) means for determining the shade of each grid box of the target grid by determining how many grid sub-boxes within the grid box are filled.

17. The method of claim 14, wherein the shading assigned to the grid boxes of the target grid is one of sixteen discrete and selectable shading levels produced by coding each grid box of the target grid with a four-bit sequence indicating the shade of the display pixel corresponding to the grid box.

18. An apparatus for rendering a bit-mapped image having anti-aliasing effect onto a pre-specified target grid from a set of instructions defining an outline of the image, comprising:
(A) means for forming a first data defining a first plot of the outline grid-fitted onto the target grid;
(B) means for forming a second data defining a second plot of the outline which is the first plot of the outline evenly displaced on the target grid from its grid-fitted position;
(C) means for forming a third data defining a third plot of the outline which is the second plot of the outline upwardly scaled from the target grid onto a mezzanine grid, wherein plural grid boxes of the mezzanine grid tile perfectly into each grid box of the target grid; and
(D) means for forming a fourth data defining a fourth plot of the outline which is the third plot of the outline scaled back from the mezzanine grid to the target grid with shadings assigned to the grid boxes of the target grid, wherein the shading of a grid box of the target grid depends on how many grid boxes of the mezzanine within the grid box of the target grid are filled, and wherein the displacement of the second plot of the grid-fitted outline from the grid-fitted position prevents aliasing in display systems in which the display of a pixel is affected by the image of its adjacent pixel.

19. The apparatus of claim 18, further comprising
(a) means for producing and storing a bit-mapped image data from the fourth data defining the fourth plot of the outline;
(b) means for rendering the bit-mapped image data on a television display screen, wherein each of the edges of the outline is sharply displayed.

20. The method of claim 18, wherein the shading assigned to the grid boxes of the target grid is one of sixteen discrete and selectable shading levels produced by coding each grid box of the target grid with a four-bit sequence indicating the shade of the display pixel corresponding to the grid box.

21. A method for generating an image having anti-aliasing effect for display on a computer controlled display system, comprising the steps of:
(A) generating an outline of the image, wherein the outline includes a plurality of outline points defining at least one vertical edge of the outline;

(B) placing the outline onto a target grid with each of the outline points located inside one of a plurality of grid boxes of the target grid such that said at least one vertical edge of the outline extends through some of the grid boxes of the target grid, wherein the target grid represents the display pixels of a target display device and has a plurality of horizontal grid lines and a plurality of vertical grid lines and wherein an intersection of one of said horizontal grid lines and one of said vertical grid lines represents a pixel center of said target display device, and wherein said placing step places each of the outline points away from pixel centers of said target display device;

(C) assigning a shading level to the grid boxes of the target grid in order to provide the anti-aliasing effect to the outline on the target grid by determining a shade of each grid box of the target grid through which said at least one vertical edge extends, and wherein the placing of the outline prevents aliasing in display systems in which the display of a pixel is affected by the image of its adjacent pixel.

* * * * *

UNITED STATES PATENT AND TRADEMARK OFFICE
CERTIFICATE OF CORRECTION

| | | |
|---|---|---|
| PATENT NO. | : | 5,719,595 |
| DATED | : | February 17, 1998 |
| INVENTOR(S) | : | Hoddie et al. |

It is certified that error appears in the above-identified patent and that said Letters Patent is hereby corrected as shown below:

On the title page,
Item [54], and col. 1, line 1, delete "APPARAUTS" and insert --APPARATUS--

In column 4 at line 4 delete "weft" and insert --well--

Signed and Sealed this

Nineteenth Day of May, 1998

Attest:

Attesting Officer

BRUCE LEHMAN

Commissioner of Patents and Trademarks